United States Patent [19]

Bluggel et al.

[11] 3,902,736
[45] Sept. 2, 1975

[54] PASSIVE ACTUATING DEVICE FOR A SAFETY BELT

[75] Inventors: Erwin Bluggel; Andreas Bauer, both of Fallersleben, Germany

[73] Assignee: Volkswagenwerk Aktiengesellschaft, Germany

[22] Filed: June 5, 1974

[21] Appl. No.: 476,448

[30] Foreign Application Priority Data
June 9, 1973 Germany.......................... 2329538

[52] U.S. Cl............................................ 280/150 SB
[51] Int. Cl.²........................................ B60R 21/10
[58] Field of Search............. 280/150 SB; 180/82 C

[56] References Cited
UNITED STATES PATENTS

| | | | |
|---|---|---|---|
| 3,583,726 | 6/1971 | Lindblad | 280/150 SB |
| 3,754,776 | 8/1973 | Cataldo | 280/150 SB |
| 3,806,155 | 4/1974 | Hafele | 280/150 SB |

*Primary Examiner*—Robert R. Song
*Attorney, Agent, or Firm*—Brumbaugh, Graves, Donohue & Raymond

[57] ABSTRACT

The device comprises an angle lever having two arms pivotally supported in a door of a vehicle. One of the arms is connected to the vehicle body via force transfer means, which causes the lever to pivot when the door is opened, moving a tension line between the other arm thereby allowing a spring loaded connecting link to remove or apply the belt.

11 Claims, 2 Drawing Figures

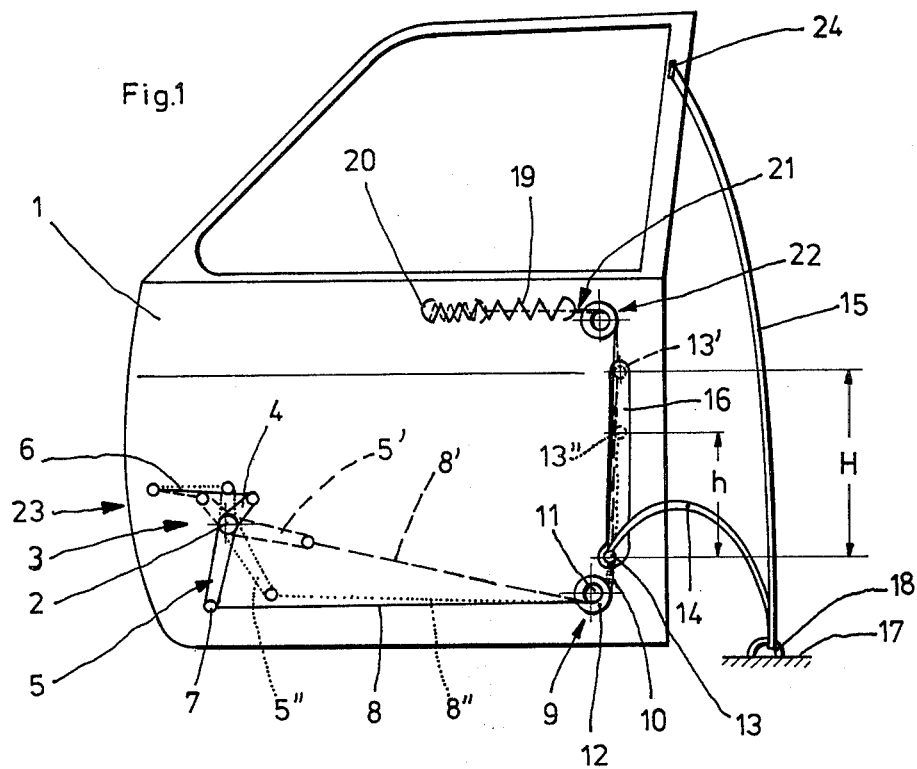
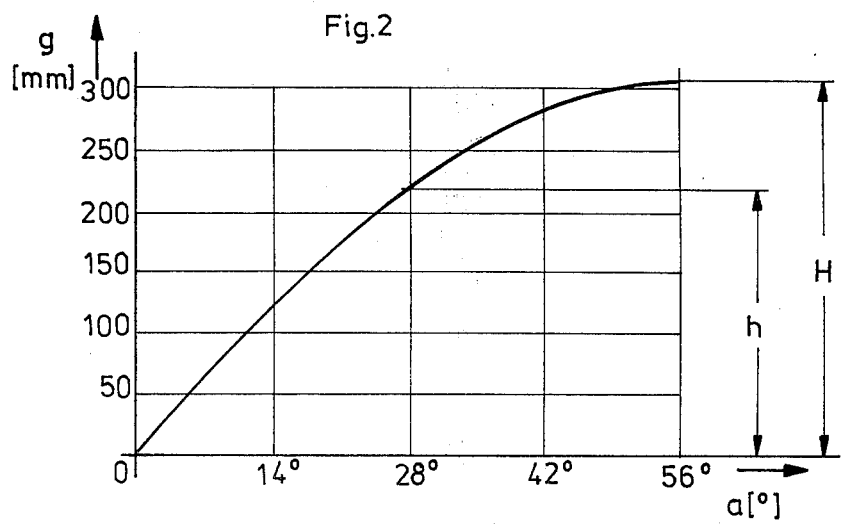

PASSIVE ACTUATING DEVICE FOR A SAFETY BELT

BACKGROUND OF THE INVENTION

Passive actuating devices for seat belts have been known heretofore e.g., from published West German patent application (Offenlegungsschrift) 1,918,427. Such devices automatically apply a safety belt onto a passenger when a door adjacent the passenger is closed and release the safety belt automatically when the door is opened.

As a practical matter it has been found that passengers frequently neglect fastening their safety belts, so that their presence in a vehicle has had only a limited success in improving the safety of the vehicle.

There have been described heretofore automatic methods of actuating safety belts. Such devices have generally not worked well unless the door used to enter and leave the vehicle is fully opened. It has been found that vehicle doors are frequently opened to an angle on the order of only 30°. Reasons for this are many, but typically there is limited space for opening the door due to adjacent vehicles in parking areas or traffic flow in curb parking.

SUMMARY OF THE INVENTION

In accordance with the present invention a passive actuating device which is capable of applying or removing a safety belt in a vehicle despite a relatively small door opening angle is provided. This is accomplished by connecting one arm of a pivotally mounted angle lever to the body of the vehicle via a force transfer element and connecting the other arm of the lever to the safety belt by a tension line containing a roller arrangement adapted to change the direction of the tension line. The safety belt is attached to the tension line, and a spring arrangement in the door provides tension on the line.

The arm connected to the cable is initially moved substantially tangentially toward the roller arrangement when the angle lever pivots. The distance between the arm of the angle lever and the roller arrangement is decreased by a greater amount per degree of door opening when the door is opened initially than when the door is opened wider. This causes a fast movement of the safety belt away from the passenger when the door is first opened. As the door is opened wider, the rate of the movement of the safety belt away from the passenger decreases. It is possible to attain 75% of the lift-off of the safety belt by opening the door to an angle of only 28°.

One embodiment of the invention comprises a roller arrangement having two concentric rollers which are connected together. One of the rollers, having a smaller diameter than the other roller, is connected to the lever arm by the tension line. The other roller, having a larger diameter, is connected to the tension spring through a connecting link. The end of the connecting link closest to the roller arrangement is attached to the safety belt. Movements of the part of the cable line connected to the angle lever are translated into larger movements of the connecting link by the roller arrangement in accordance with the ratio of the diameters of the two concentric rollers.

BRIEF DESCRIPTION OF THE DRAWINGS

In the drawings:

FIG. 1 shows the inside of the right front door of a motor vehicle employing the present invention; and FIG. 2 is a graph of the vertical travel of the connecting point of the safety belt as related to the angle to which the door of the vehicle is opened.

DESCRIPTION OF THE PREFERRED EMBODIMENT

Referring generally to FIG. 1, a vehicle door 1 is shown with its outside panel removed exposing the preferred embodiment of the present invention. The invention is shown to comprise an angle lever 3 mounted on a pivot 2 and having a first arm 4 and a second arm 5. The first arm 4 of the angle lever 3 is connected to the body of the vehicle by means of a force transfer element 6. The connection of the force transfer element 6 to the body of the vehicle may be at a door stop (not shown). The connection of the first arm 4 to the body of the vehicle is such that the lever 3 pivots in a counterclockwise direction for a right side door having its hinge towards the front of the vehicle as the door 1 is opened. Connected to the end 7 of the second arm 5 is a tension line 8 having its other end attached to a roller arrangement 9 mounted in the lower corner of the door and adapted to change the direction of the tension line 8.

The roller arrangement 9 of the preferred embodiment comprises a pair of concentric rollers 11, 12 one of which 11 has a smaller diameter than the other one 12. The roller 12 having the larger diameter is attached to a cable 10 which is attached to a connecting link 13 positioned between the concentric rollers 11, 12 and a second roller 22 located in the corner of the door vertically above the roller arrangement 9 and adapted to change the direction of the connecting link 13, the end of which is attached to the end 21 of the tension spring 19. The other end 20 of the spring 19 is mounted on the door 1.

The safety belt of the preferred embodiment is a three-point belt comprising a lap portion 14 and a shoulder portion 24. One end 24 of the shoulder portion 15 of the belt is mounted on the upper corner of the door 1 of the vehicle. The belt slides through a holding element 18 anchored on the floor 17 of the vehicle on the side of the seat opposite the side on which the door 1 is located. The lap portion 14 of the safety belt extends from the holding element 18, through a connecting link guide 16, to the lower portion of the connecting link 13 where it is attached.

When the door 1 is opened, the lever 3 pivots in a counterclockwise direction moving the second arm 5 toward the roller arrangement 9 thereby allowing the tension spring 19 to move the connecting link 13 upward from the roller arrangement 9. The end of the lap portion 14 of the belt, which is connected to the lower part of the connecting link 13 is thereby moved upward as the door 1 is opened.

The lever 3 is arranged so that the second arm 5 moves substantially tangentially toward the roller arrangement 9 as the door 1 starts to open from a closed position. This arrangement provides a large initial movement of the second arm 5 toward the roller arrangement 9 as the door 1 starts to open. The purpose of the concentric rollers 11, 12 of the preferred embodiment is to amplify the movement of the connecting link 13 with respect to the tension line 8. The movement of the cable 10 attached to the connection link 13 is a multiple of the magnitude of the movement of the tension line 8 attached by the second arm 5 and the smaller roller 11. The ratio of the magnitude of movement between the cable 10 and the tension line 8 is equal to the ratio of the radius of the larger roller 12 to the radius of the smaller roller 11. Thus, as the larger roller 12 has a radius equal to twice that of the smaller roller 11, the cable 10 will move twice as far as the tension line 8 when the second arm 5 moves towards the rollers 11, 12.

It should be recognized by one skilled in the art that the amplification provided by the concentric rollers 11, 12 can be provided instead by the angle lever 3 by making the first arm 4 of the angle lever 3 shorter than the second arm 5.

As the door 1 opens, the end of the lap portion 14 of the safety belt moves vertically upward. The height of the end of the lap portion 14 is designated in general by $h$. The maximum height to which the end of the lap portion 14 of the safety belt can be moved is designated by H. Referring generally to FIG. 2, the relationship between the vertical placement of the end of the lap portion 14 of the safety belt and the angle to which the door 1 is opened is shown. Small initial movements of the door cause large initial movements of the end of the lap portion 14 of the safety belt. In particular, the end of the lap portion 14 of the safety belt is moved to approximately 75% of its maximum height H, by opening the door 1 to an angle of approximately 30°.

We claim:

1. A passive actuating device for a safety belt associated with a vehicle passenger comprising, in combination:
   a. an angle lever having a first arm and a second arm, the angle lever being pivotally mounted in a door of a vehicle;
   b. force transfer means coupling the first arm to the body of the vehicle for pivoting the angle lever as the door is opened and closed;
   c. a tension line arranged in the door and coupling the second arm to the safety belt;
   d. roller means arranged in the door for changing the direction of the tension line;
   e. spring means being in connection with the end of the tension line which is coupled to the safety belt for biasing the safety belt away from a passenger holding position so that the safety belt will be in a passenger holding position when the door is closed and will rise upward to a free position when the door is opened, the angle lever being oriented with respect to the roller means such that the angle between the second arm and the portion of the tension line extending between the second arm and the roller means is at a minimum when the door is closed and increases to a maximum as the door opens.

2. The passive actuating device defined in claim 1, wherein said minimum value of said angle is at least approximately 90°.

3. The passive actuating device defined in claim 1, wherein said maximum value of said angle is at least approximately 180°.

4. The passive actuating device defined in claim 1, wherein said angle lever is mounted at a region of the door on the hinge side thereof, and wherein said door includes a guide for the safety belt at a region thereof which is opposite to said hinge side.

5. The passive actuating device defined in claim 1, wherein said guide extends at least approximately vertically.

6. The passive actuating device defined in claim 1, wherein said roller means is arranged in the door at least approximately below the point at which the safety belt is attached when in the passenger-holding position.

7. The passive actuating device defined in claim 1, wherein the roller means comprises a pair of concentric rollers which are coupled for rotation, one with the other, and one of which has a smaller diameter than the other; and wherein said tension line comprises a first portion extending between the second arm of the angle lever and the smaller roller, and a second portion extending between the larger roller and the safety belt.

8. The passive actuating device defined in claim 1, wherein said spring means comprises a tension spring; and wherein said device further comprises:
   a second tension line arranged in the door and coupling said tension spring to the safety belt; and
   a second roller means arranged in the door for changing the direction of the second tension line.

9. The passive actuating device defined in claim 8, wherein said second roller means is mounted in such a way that the path of motion of the connecting point of the safety belt is tangent thereto.

10. The passive actuating device defined in claim 8, wherein said second roller means comprises a pair of concentric rollers which are coupled for rotation, one with the other, and one of which has a smaller diameter than the other; and wherein said second tension line comprises a first portion extending between said tension spring and the smaller roller, and a second portion extending between the larger roller and the safety belt.

11. The passive actuating device defined in claim 1, wherein said force transfer means is a door stop.

* * * * *